United States Patent [19]

Tucker et al.

[11] 4,410,925
[45] Oct. 18, 1983

[54] GROUND FAULT DETECTOR AND SHUTDOWN SYSTEM

[75] Inventors: Leroy W. Tucker, Camarillo; Floyd E. Nelson, Oxnard, both of Calif.

[73] Assignee: The United States of America as represented by the Secretary of the Navy, Washington, D.C.

[21] Appl. No.: 360,524

[22] Filed: Mar. 22, 1982

[51] Int. Cl.³ .............................................. H02H 3/16
[52] U.S. Cl. ........................................ 361/42; 361/49
[58] Field of Search .............................. 361/42, 47–50

[56] References Cited

U.S. PATENT DOCUMENTS

| | | |
|---|---|---|
| 2,991,397 | 7/1961 | Place . |
| 3,386,002 | 5/1968 | Russell ................................ 361/50 |
| 3,407,337 | 10/1968 | Benham . |
| 3,665,252 | 5/1972 | Rogers, Sr. et al. . |
| 3,670,206 | 6/1972 | Sircom . |
| 3,676,738 | 8/1972 | Scanlan . |
| 3,864,581 | 2/1975 | Satyanarayana . |
| 3,911,323 | 10/1975 | Wilson et al. . |
| 3,995,200 | 11/1976 | Stolarczyk . |
| 3,996,496 | 12/1976 | Volk, Jr. . |
| 4,031,431 | 6/1977 | Gross ............................. 361/42 X |
| 4,159,501 | 6/1979 | White ............................. 361/42 X |

*Primary Examiner*—Harry E. Moose, Jr.
*Attorney, Agent, or Firm*—Robert F. Beers; Joseph M. St. Amand

[57] ABSTRACT

A ground fault detection and shutoff system for underwater power transmission provides protection to divers from swimming into electric fields. This system uses DC power to monitor the true resistance of the load system rather than the AC power to the load. The system comprises DC power supply, ground fault monitor, circuit breaker and isolation transformer which monitors the system's DC resistance to ground and shuts off the power system if the resistance falls below a preset value.

9 Claims, 3 Drawing Figures

GROUND FAULT DETECTOR AND SHUTDOWN SYSTEM

BACKGROUND OF THE INVENTION

This invention relates to ground fault detectors and shutdown systems, and particularly to a ground fault detection and shutdown system for underwater power transmission to prevent divers from exposure to electrical shock hazards.

On land, the operator or user of an electrical power system must come into direct contact with the electrical system and become part of the circuit to be injured. However, underwater a diver does not have to make contact with the electrical circuit to be injured, since a break in the system insulation can allow stray electrical currents to flow through the water. Such stray currents can shock a diver if he swims into the leakage path.

As tools for underwater use by divers become more sophisticated and larger work systems developed, more power to operate these devices is required. Due to the flow losses and handling problems associated with large hydraulic power systems, other power sources must be developed. Electrical power can be used underwater to fill this need if used with properly designed protection systems. However, stringent safety systems are required to protect divers from electric shock.

There are two ways a diver can receive an electrical shock: by direct contact with a live conductor, and by swimming into an electrical field created by a leakage current in the water. Either of these circumstances can cause the diver to suffer an involuntary physical reaction. The seriousness of the effects of electrical shock depends upon the frequency of the current, the magnitude of the current, the current path through the body, and the shock duration.

The physical effects of electrical shock represent only a part of the problem facing the diver. For example, an involuntary physical reaction to very small leakage currents could cause him to drop a tool or release a heavy object, injuring himself or others. Larger shock currents that result in respiratory arrest obviously present a very severe hazard to the diver. Since the diver must be taken to the surface for treatment, many factors must be considered prior to surfacing, such as depth of the dive, time at depth, and decompression schedule. For these reasons, any electrical systems used by divers must incorporate an effective ground fault detector system. The ground fault detector system should eliminate even the diver's perception of being shocked in case of a ground fault in the electrical power system.

All of the methods for protecting divers from electrical shock fall into one of two categories: passive and active. Passive methods of protection are: insulation; double insulation; screening (shielding); earthing (grounding); and isolation. Active methods of protection are: earth-leakage circuit breakers; earth continuity monitor; line insulation monitor; detection of primary defect where two defects are needed to present a shock hazard; fail-safe design; and, quality control and preventive maintenance to ensure reliability.

Reliable protection from shock hazards cannot be obtained for divers by passive methods as in dry land systems. Without active monitoring systems to detect water intrusion, passive methods can be defeated and the diver not be aware of his loss of protection.

Prior ground fault detection and/or interruption systems use AC power and monitor AC leakage currents to ground or continuity of the ground circuit relative to the neutral wire. Several prior systems use differential transformers as an AC leakage current sensing element; such devices cannot allow for leakage due to the distributed capacitance of long transmission lines (greater than 100 feet, for example). Other systems monitor the status of the ground path but provide no protection for humans contacting a hot line, or protect only the transmission line and not the operator of equipment it supplies power to.

There are no prior art fault protection systems which meet diver electrical safety criteria. Commercially available ground fault interruptors will not remove power fast enough and are subject to nuisance power shutdowns. Such prior type systems are primarily for terrestrial application and not applicable for underwater power transmission.

SUMMARY OF THE INVENTION

The ground fault detector and shutdown system of the present invention provides a ground fault protection system for underwater power transmission.

It provides a means to dissipate energy stored in the transmission line and load quickly in case of shutdown, and will shutdown all power in less than 10 milliseconds, as well as work without nuisance tripping on long transmission lines.

The systems of this invention is designed to make the use of electricity safe underwater or in other wet locations. The diver can use the system to protect the power for lights, underwater television, or inspection devices; he can also use the system to protect the power supplied to any equipment required on a ship deck of pier being used as the dive station. This device uses a DC power source to monitor the true resistance of the load circuit rather than AC which prior systems use to monitor stray capacitance and insulative resistance. In the present system the AC transmission line power for driving the load is superimposed on the DC, and as long as there is no ground fault in the load circuit there is no return path for the DC.

This system includes DC power sources, circuit breaker, isolation transformer, ground fault monitor and relays, and is constructed of standard electronic components arranged into a circuit which monitors the power transmission system's DC resistance to ground. If the resistance to ground falls below a preset value, the power transmission system is shut down. The present system will operate to shutdown all power to the system within 10 milliseconds with a leakage current of 5 milliamperes, and eliminate tripping due to capacitance coupling of the transmission lines to ground for line lengths up to 1500 feet, for example.

DESCRIPTION OF THE PREFERRED EMBODIMENTS

Figure 1:
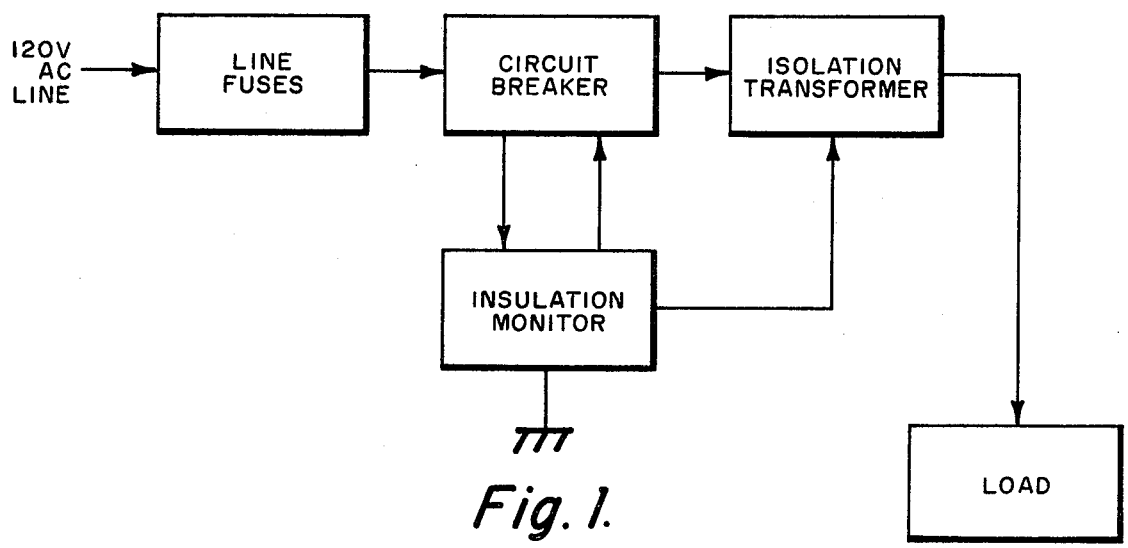
FIG. 1 is a simplified block diagram of the portable ground fault detector and shutdown system of the present invention.

A simplified block diagram for the portable ground fault protection system is shown in FIG. 1; this system employs eight of the eleven methods of protection previously mentioned. Of the passive methods, only double insulation is not used because of the difficulty in maintaining or monitoring watertight integrity between two insulating layers. Of the active methods, earth-leakage circuit breakers are not used for two reasons: they are subject to nuisance tripping caused by capacitance coupling to ground in AC systems, and they have slow contact opening times (>10 msec).

Figure 2:
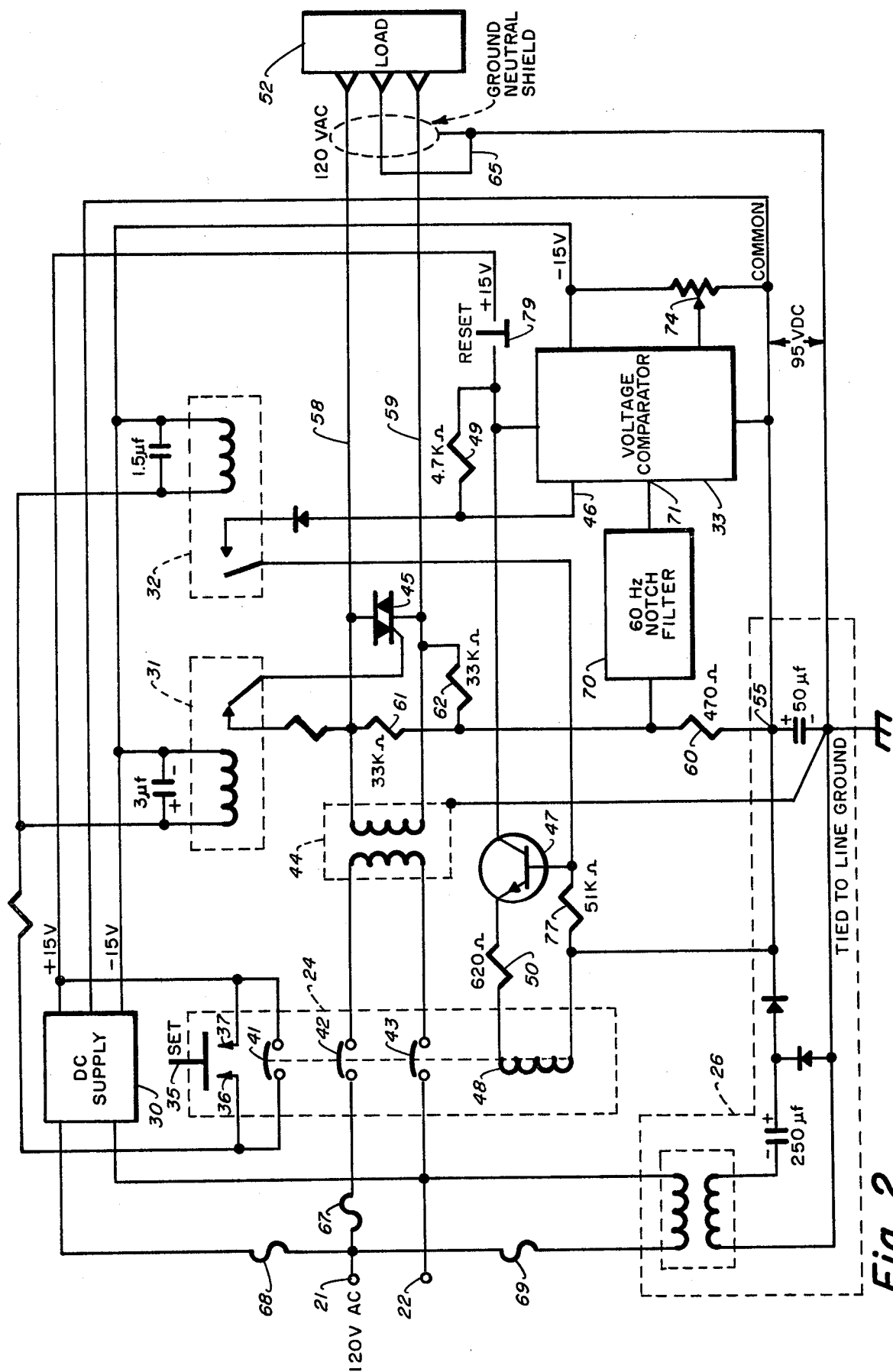
FIG. 2 is a schematic diagram of a preferred embodiment of the invention.

The ground fault detection circuit monitors the AC power in the load circuit for breakdowns in insulation resistance. If the insulation resistance drops below a predetermined level (for example, 50 K$\Omega$), the circuit breaker is tripped. The system is also designed to trip the circuit breaker if the internal DC supply fails or upon failure of any of the monitoring circuits. A complete schematic of the system is shown in FIG. 2 where some component values are given merely by way of example. For convenience all components of the system can be packaged inside the isolation transformer housing to form a small compact unit of light weight.

As shown in FIG. 2, a 120 volt AC power source is supplied to input terminals 21 and 22. Circuit breaker 24 is shown in its open position. The 120 volt AC source is also connected to an insulation monitor DC supply 26 which includes a step-down transformer and rectifier circuit; 120 volts AC is also connected to operate a second DC supply 30 which powers relay switches 31 and 32, via circuit breaker 24, and voltage comparator 33.

When set button 35 of circuit breaker 24 is manually pushed down closing contacts 36 and 37, relays 31 and 32 are energized, opening relay switch 31 and closing relay switch 32. While set button 35 is held down, circuit breaker 24 is manually operated to close all three sets of terminal switches 41, 42 and 43. When switch 41 of circuit breaker 24 is closed, set button 35 can be released since switch 41 functions in the same manner as set button 35. Also, with switches 42 and 43 closed, AC power is supplied to the input or primary winding of isolation transformer 44. Isolation transformer 44 has a 1 to 1 ratio of input to output, and low capacitance between the primary and secondary windings and between the windings and case. The transformer case is tied to ground as shown.

With relay 31 energized and the relay switch opened triac 45 is turned off. During their normal operation, triac 45 functions as a low resistance path for discharging any stored energy in the load circuit 52. With relay 32 energized and its switch closed, a positive voltage from output 46 of voltage comparator 33 operates to turn-on transistor 47 allowing power to be applied to the holding coil 48 of circuit breaker 24 via bias resistor 48 and current limiting resistor 50; thus, switches 41, 42 and 43 of circuit breaker 24 are held in the closed position. When switches 42 and 43 are closed during normal operation, load 52 is supplied power (120 volts AC) via the output or secondary winding of isolation transformer 44.

The positive side of a DC voltage (e.g., 95 V DC), at the output 55 of the insulation monitor DC voltage supply 26, is connected to both AC lines, 58 and 59, on the load side of isolation transformer 44 via resistor 60 and two matched resistors 61 and 62. The negative side of DC supply 26 is connected to ground (seawater) as shown. The negative side of DC voltage supply 26 is also connected to the ground wire 65 in the load circuit and to transmission cable shield or ground wires if used.

As long as the insulation resistance in the load circuit does not fail, no DC current will flow. If the insulation resistance drops either from deterioration due to age, abrasion, or from damage during handling, a small DC current will flow in the monitor circuit. While there is no return path for AC leakage currents there are paths for any DC leakage in the system. When there is an insulation failure in the system DC leakage current flow will establish a DC voltage differential across resistor 60 which is sensed by voltage comparator 33. Should the resistance drop below a predetermined value a trip signal is initiated by comparator 33 and sent to the circuit breaker 24. The DC leakage current flowing through resistor 60 develops a DC voltage which is proportional to the ground resistance; that DC voltage is fed through a 60 Hz notch filter 70 and appears at input 71 to voltage comparator 33. If the input at 71 exceeds a predetermined reference level set by potentiometer 74, the output at 46 changes state from a positive to a low level negative voltage, as a trip signal, and turns-off transistor 47 which results in deenergizing holding coil 48 in circuit breaker 24 and opening switches 42 and 43, thus shutting off AC power to the load.

With relay switch 32 closed, bias resistors 49 and 77 form a voltage divider which provide a fixed voltage on the base of transistor 47. Potentiometer 74 can be adjusted to allow more or less ground fault before shutdown will occur. The capacitor (e.g., 3 $\mu$f) across the coil of relay 31 provides sufficient energy to the relay coil to keep relay switch 31 open for several milliseconds, thus providing a delay to prevent short circuit currents from flowing through triac 45 until after the switch in relay 31 opens. Thus the circuit breaker does not have to break while short circuit currents are flowing and transients are not induced back into the supply system. A direct short across transmission lines 48 and 59 will cause fuse 67 to open. During normal operation, the triac 45 function as a low-resistance path for discharging any stored energy in the load circuit. Fuses 68 and 69 are for protection in the lines to DC supplies 26 and 30, respectively.

Reset button 79, normally in open position, as shown, is used to reset voltage comparator 33 once the ground fault has been repaired, thus permitting the system to be reactivated.

The use of an isolation transformer 44 in the protection circuit protects a diver from being shocked by AC fault currents during the first malfunction because a single fault does not provide a return path for current flow. The DC current that does flow in the case of one ground fault is limited, for example, to 7 mA by the 33 K$\Omega$ resistors 61 and 62 connecting DC supply 26 to the AC lines 58 and 59. Six mA of continuous current flow is just above the perception level for DC currents, but in this case, it will flow only for a maximum of 10 msec, and probably not be sensed by the diver.

If a second fault should occur in the load circuit during the 10 msec required for the circuit to shut down, it is possible for the diver to be exposed to a small AC current for a time less than 10 msec. Based on a body resistance of 500$\Omega$ and a 120-V supply, the maximum current flow a diver could experience is 240 mA.

This current level is well below the safe level for shock durations of less than 10 msec.

Figure 3:
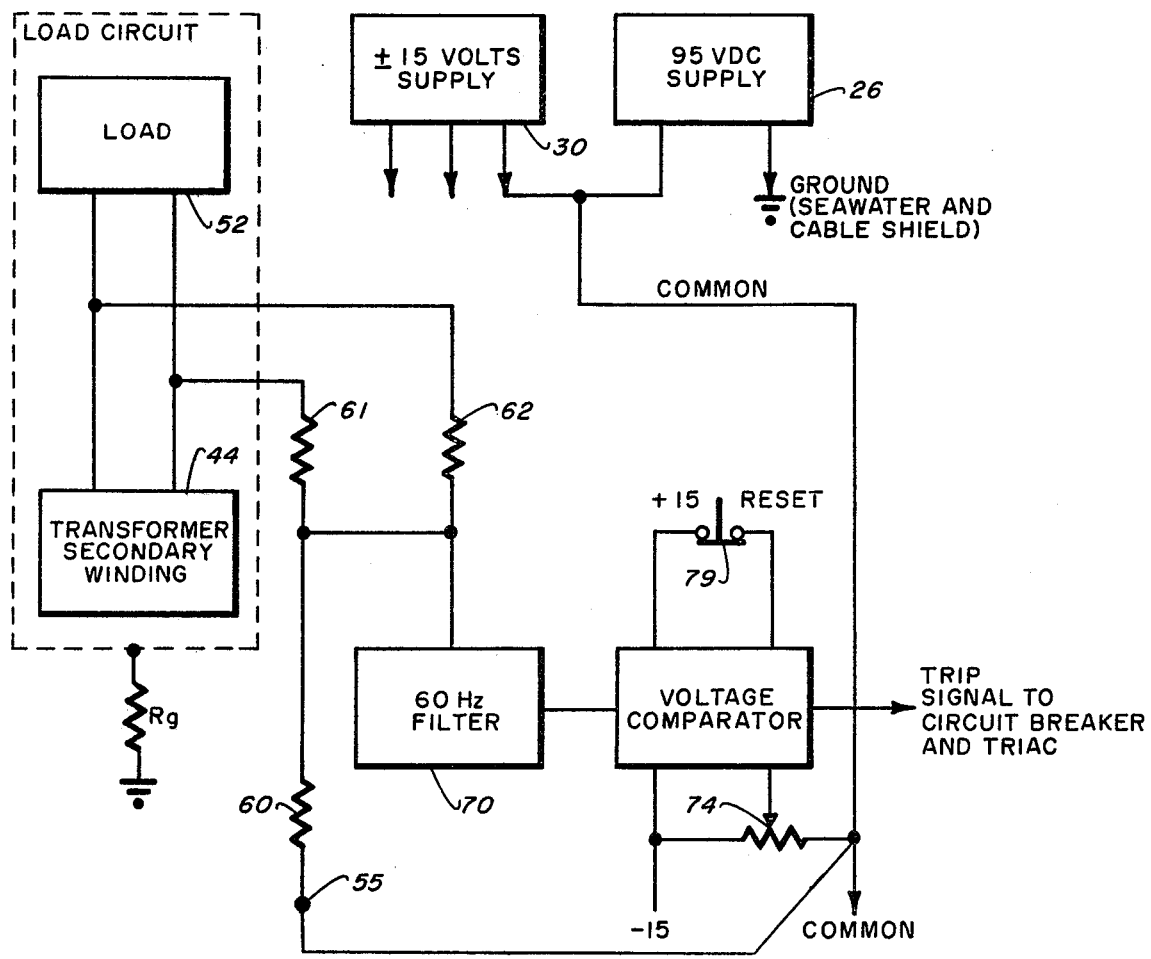
FIG. 3 shows a simplified schematic diagram of the insulation resistance monitor portion of the system shown in FIG. 2.

A simplified schematic diagram of the insulation resistance monitor portion of the system shown in FIG. 2, is illustrated in FIG. 3.

The positive side of the insulation resistance monitor DC supply is connected at 55 to the secondary of the isolation transformer 44 through resistors 60, 61 and 62; the negative side of the supply is connected to ground. Ground refers to the ground conductor in the housing, the power cable, seawater, and the cable shield or armor wires. If a ground ($R_g$) should develop in the load circuit, a small DC current will flow through the voltage divider formed by resistor 60 and resistors 61 and 62. The voltage developed across resistor 60 is compared to a level set in the comparator by potentiometer 74. When the current flow increases to a point where the voltage drop across resistor 60 exceeds the trip level, a signal is sent from the voltage comparator 33 to the circuit breaker to trip it. Any 60-Hertz signal is blocked by the 60-Hertz notch filter 70. Once a trip signal has been generated, the circuit breaker cannot be reset until the fault has been cleared and switch 79 pushed to reset the voltage comparator 33.

Obviously many modifications and variations of the present invention are possible in the light of the above teachings. It is therefore to be understood that within the scope of the appended claims the invetion may be practiced otherwise than as specifically described.

What is claimed is:

1. A ground fault detection and power shutoff system for underwater AC power transmission which provides protection to divers from underwater electrical shock hazards, comprising:
   a. an insulated pair of electrical power transmission lines which supply AC power from a source to an insulated underwater load;
   b. an isolation transformer having a primary and a secondary winding; said secondary winding connected to the input to said insulated pair of power transmission lines;
   c. a triac connected across the secondary winding of said isolation transformer operable to function as a low resistance path for discharging any stored energy in the load circuit;
   d. circuit breaker means connected between said source of AC power and the primary winding of said isolation transformer; said circuit breaker means being operable to interrupt the flow of AC power through said pair of transmission lines;
   e. an insulation resistance monitor circuit including DC supply means for providing a DC output and voltage comparator means; said DC supply means having a positive side of its DC output connected to both of said pair of transmission lines at the secondary winding side of said isolation transformer and to said voltage comparator and a negative side of its DC output connected to ground means; said ground means including any of transmission line ground conductor and shielding, load ground conductor and shielding, and seawater;
   f. said voltage comparator means being connected to said circuit breaker means and being operable to generate a trip signal for quickly shutting off said circuit breaker means to interrupt the flow of AC power through said transmission lines when there is ground fault due to a drop below a predetermined value in the insulation resistance of any insulation in the system which results in a DC current flow in said insulation resistance monitor circuit means exceeding a predetermined level.

2. A system as in claim 1 wherein line fuse means are provided in said transmission lines which are operable to open due to short-circuit currents should for any reason said circuit breaker means fail to operate properly for interrupting the flow of AC power.

3. A system as in claim 1 wherein said insulation resistance monitor circuit includes a voltage divider means which connects the positive side of the output of said DC supply to said pair of transmission lines; said voltage comparator means being connected to the positive side of the output of said DC supply across a first portion of said voltage divider means for detecting any DC leakage current therethrough due to a drop in insulation resistance exceeding a predetermined level; said trip signal being generated by the voltage comparator means when said DC leakage current flow exceeding a predetermined level is detected.

4. A system as in claim 3 wherein filter means is provided between said voltage divider means and said voltage comparator means to filter out any AC from said transmission lines.

5. A system as in claim 3 wherein each of the pair of said transmission lines is connected to the end of one of a matched pair of resistors forming two legs of a second portion of said voltage divider means.

6. A system as in claim 3 wherein adjustment means is provided in said voltage comparator means to change the level of ground fault that will result in a trip signal to cause said circuit breaker to interrupt the AC power flow.

7. A system as in claim 1 wherein said isolation transformer has a 1 to 1 ratio of input to output and low capacitance between the primary and secondary windings, and between windings and ground.

8. A system as in claim 1 wherein delay means is provided to allow said circuit breaker means to open upon detection of a ground fault before said triac is permitted to function as a low resistance path for discharging any stored energy in the load circuit whereby said circuit breaker means does not open while short-circuit currents are flowing and transients are not induced back into the AC supply.

9. A system as in claim 3 wherein the DC leakage current flow through said voltage divider means is proportional to the breakdown or drop in insulation resistance.

* * * * *